(12) United States Patent
Lin et al.

(10) Patent No.: US 12,437,740 B2
(45) Date of Patent: Oct. 7, 2025

(54) SYSTEM AND METHOD OF ABSORBING AIRBORNE NOISE IN A COMPUTING SYSTEM

(71) Applicant: Hewlett Packard Enterprise Development LP, Houston, TX (US)

(72) Inventors: Phoebus Lin, Taipei (TW); Hsin Chang Lu, Taipei (TW); Junco Chen, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 671 days.

(21) Appl. No.: 16/947,710

(22) Filed: Aug. 13, 2020

(65) Prior Publication Data

US 2022/0051649 A1 Feb. 17, 2022

(51) Int. Cl.
*G10K 11/162* (2006.01)
*G06F 1/20* (2006.01)
*G10K 11/16* (2006.01)
*H05K 7/20* (2006.01)

(52) U.S. Cl.
CPC ............ *G10K 11/162* (2013.01); *G06F 1/203* (2013.01); *G10K 11/161* (2013.01); *H05K 7/20172* (2013.01)

(58) Field of Classification Search
CPC .... G10K 11/162; G10K 11/161; G06F 1/203; G06F 1/183; G06F 1/20; G11B 21/24; G11B 33/08; H05K 7/20172; H05K 7/20727; H05K 7/20709
USPC .................. 181/224, 225, 287, 200; 361/695
See application file for complete search history.

(56) References Cited

U.S. PATENT DOCUMENTS

| | | | | |
|---|---|---|---|---|
| 6,104,608 A * | 8/2000 | Casinelli | ................. | F24F 13/24 181/224 |
| 6,481,527 B1 * | 11/2002 | French | .................... | G10K 11/16 181/198 |
| 6,745,149 B2 * | 6/2004 | Beeten | ............... | H05K 7/20136 702/132 |

(Continued)

OTHER PUBLICATIONS

Machine translation of CN-111831088-A. "Daming Air Cooling Radiating System and Server". Inventor: Xue, Kui-jiao. Date Published: Oct. 27, 2020. (Year: 2020).*

*Primary Examiner* — Dedei K Hammond
*Assistant Examiner* — Jennifer B. Olson
(74) *Attorney, Agent, or Firm* — Hewlett Packard Enterprise Patent Department

(57) ABSTRACT

Example implementations relate to a method and system of cooling a computing system, while simultaneously absorbing airborne noise in the computing system. The computing system includes a chassis having a base and a pair of walls coupled to a peripheral side of the base, and a plurality of rotational drives disposed in the chassis. The computing system includes a frame having a plurality of first openings, and a first acoustic absorber having a plurality of second openings, coupled to the frame to form an acoustic absorber frame. The acoustic absorber frame extends along a lateral direction, disposed downstream relative to the plurality of rotational drives, and coupled to the pair of walls. Each second opening is concentrically aligned to a respective first opening. The computing system includes a plurality of fans coupled to frame and disposed downstream relative to the frame, and aligned to the respective first opening.

20 Claims, 9 Drawing Sheets

(56) References Cited

U.S. PATENT DOCUMENTS

| | | | |
|---|---|---|---|
| 7,312,991 B2* | 12/2007 | Lee | F16F 15/073 |
| | | | 415/213.1 |
| 7,779,960 B2* | 8/2010 | Tang | H05K 7/20172 |
| | | | 181/224 |
| 10,565,974 B1* | 2/2020 | Bhatia | G11B 33/08 |
| 11,388,837 B2* | 7/2022 | Waters | G10K 11/16 |
| 2018/0247677 A1* | 8/2018 | Eguchi | G11B 33/142 |

* cited by examiner

SYSTEM AND METHOD OF ABSORBING AIRBORNE NOISE IN A COMPUTING SYSTEM

BACKGROUND

Computing system may include more and more high-powered electronic devices, such as central processors, graphics processors, storage devices, and the like to quickly process data and store the processed data. By having more numbers of high-powered electronic devices, the computing system density and power consumption has increased, which results in producing a lot of waste-heat from those devices. Therefore, such compute system may require efficient cooling mechanisms, such as a cooling fan to provide coolant air in order to cool the high-powered electronic devices. Thus, the cooling fan has become faster and louder than ever before.

BRIEF DESCRIPTION OF THE DRAWINGS

Various examples will be described below with reference to the following figures.

DETAILED DESCRIPTION

Figure 1:
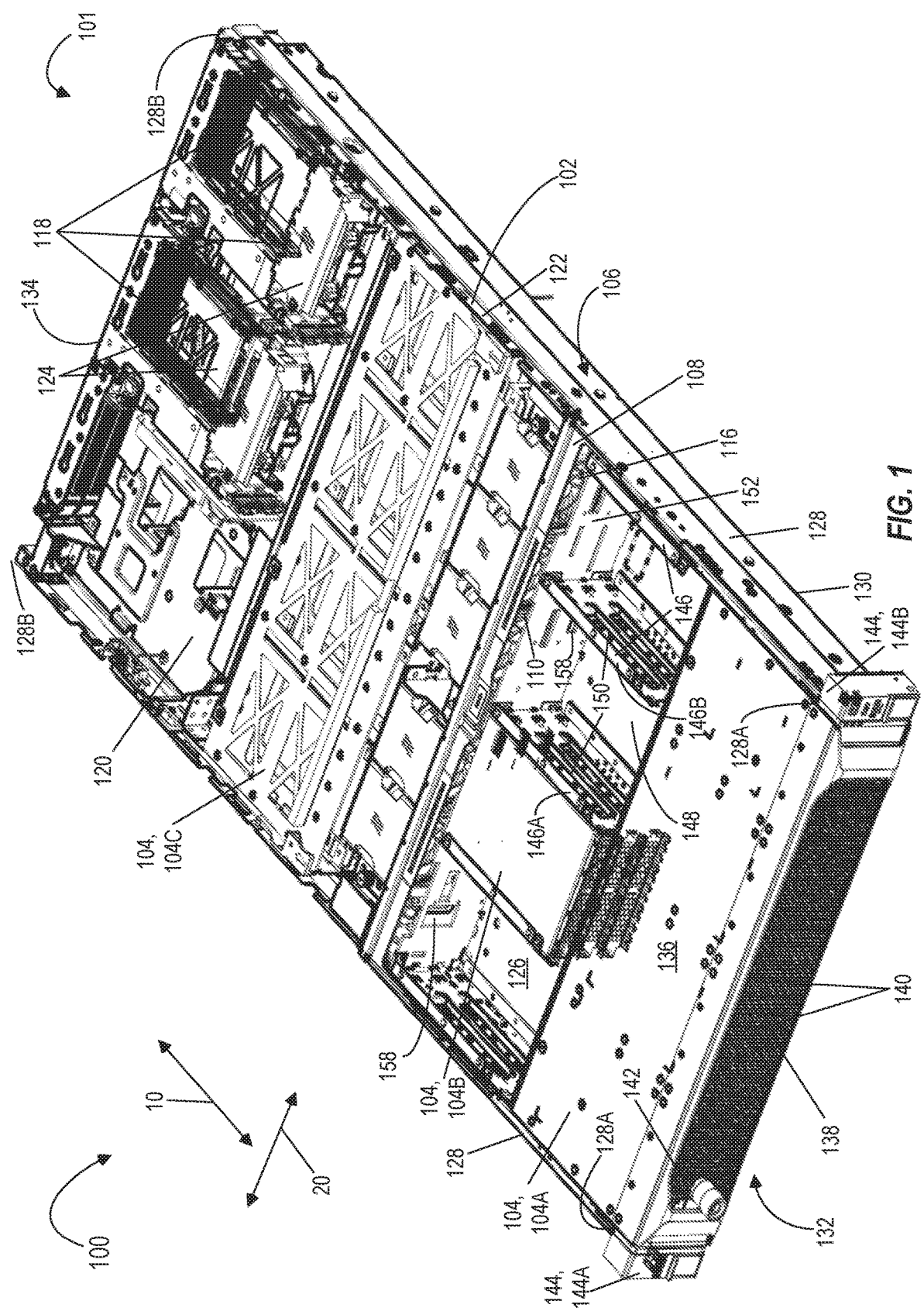
FIG. 1 illustrates an isometric view of the computing system, in accordance to some examples of the present disclosure.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, the term "downstream" may refer to a position of a component which is situated after a position of another component along the direction of which the majority of coolant air flows in a computing system. Additionally, the term "downstream" may refer to the position of the component situated after the position of other component along a direction of a flow of a coolant fluid from a front panel (bezel) to a rear panel of the computing system. Thus, a first component that is "downstream" from a second component receives coolant air after the second component. As used herein, the term "upstream" may refer a position of the component which is situated before the position of other component along the direction of which the majority of cooling air flows in the computing system. Additionally, the term "downstream" may refer to the position of the component situated before the position of other component along the direction of the flow of the coolant fluid from the front panel to the rear panel of the computing system. Thus, a first component that is "upstream" from a second component receives coolant air before the second component. As used herein, the term "concentric" may refer to a common center/axis of a first opening and a second opening. The term "concentric alignment" may refer to alignment of the first and second openings along the common axis. Further, the term "airborne noise" may refer to noise or sound waves generated by the movement of air and/or transported by the air. The term "unitary component" may refer to a single component, which is integrally formed by merging two or more components and which are not readily separable from one another. The term "stacked configuration" may refer to arrangement of components one vertically above another with a gap there between, along a direction that is perpendicular to the direction of the coolant air flow. The term "optimal speed" may refer to a maximum operating speed at which a fan may operate to draw a coolant air into the computing system. As used herein, the term "longitudinal direction" may refer to a direction along which a majority of coolant air flows through the computing system. The term "lateral direction" may refer to a direction that is perpendicular to the longitudinal direction or the direction that is perpendicular to the flow of the majority of the coolant air through the computing system. As used herein, the term "acoustic absorber" may refer to kind of an article, for example, an acoustic foam made of a polyurethane material, which may take or absorb a major portion of the sound waves (i.e., sound energy or airborne noise) when the sound waves are encountered by the article (or impacted on a surface of the article), as opposed to reflecting the major portion of the sound waves by the article.

Further, the term "front side" of the computing system may refer to a side of the computing system: i) having a display section for providing easy access to frequently used devices of the storage node, such as power switch, USB ports, and show other relevant information about the storage node to a user, ii) readily visible to the user when mounted on a rack or enclosure of a data center, and iii) having one or more clamps for enabling the computing system to be clamped to the rack or enclosure of the data center. Similarly, the term "rear side" of the computing system may refer to a mutually opposite side of the front side of the computing system i) having rarely accessed ports, such as network and power ports to connect the storage node to the respective supply unit, and ii) concealed from the user when installed in the rack or enclosure of the data center.

The present disclosure describes example implementations of a system and method of cooling a computing system, while simultaneously absorbing airborne noise or sound wave in the computing system. In some examples, the computing system includes an acoustic absorber for absorbing the airborne noise generated by a plurality of fans while drawing coolant air to cool a plurality of rotational drives of the computing system. More particularly, the acoustic absorber may be coupled to a frame to form an acoustic absorber frame. In such examples, the acoustic absorber frame is disposed along a lateral direction of the computing system and between the plurality of rotational drives and the plurality of fans, to prevent a reflected airborne noise to get transmitted (or retransmitted) to the plurality of rotational drives. Thus, the acoustic absorber may assist a user to operate the plurality of fans at an optimal capacity in order to efficiently cool the plurality of rotational drives, while simultaneously absorbing the reflected airborne noise, and thereby reduce any performance degradation of the plurality of rotational drives associated with the reflected airborne noise. In one or more examples, each of the plurality of fans may be a suction fan and each of the plurality of rotational drives may be a hard disk storage drive.

Figure 8:
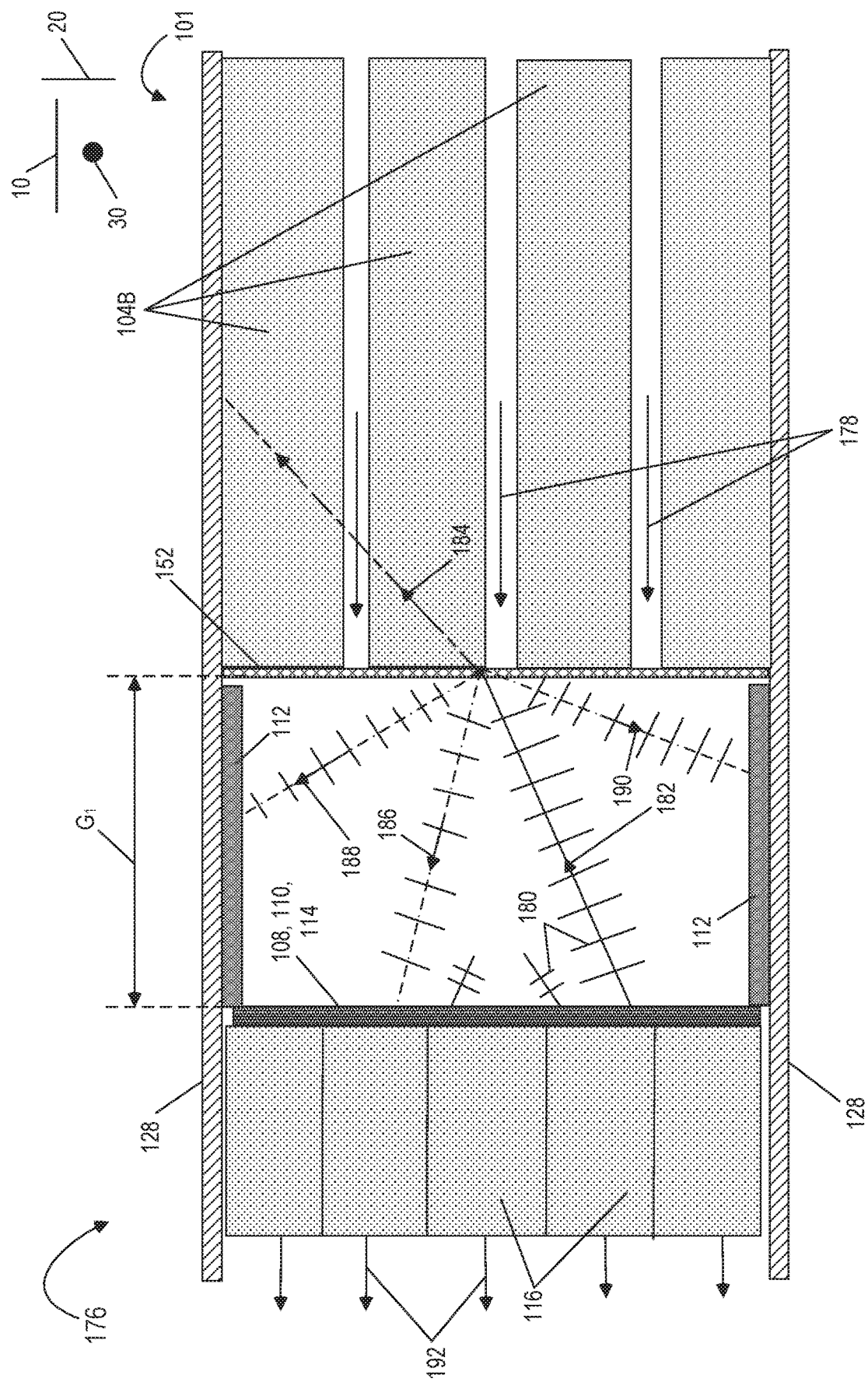
FIG. 8 is a schematic diagram depicting a top view of the computing system of FIGS. 1 and 7 and a method of cooling a plurality of second rotational drives and absorbing airborne noise in the computing system, in accordance to some examples of the present disclosure.
Figure 9:
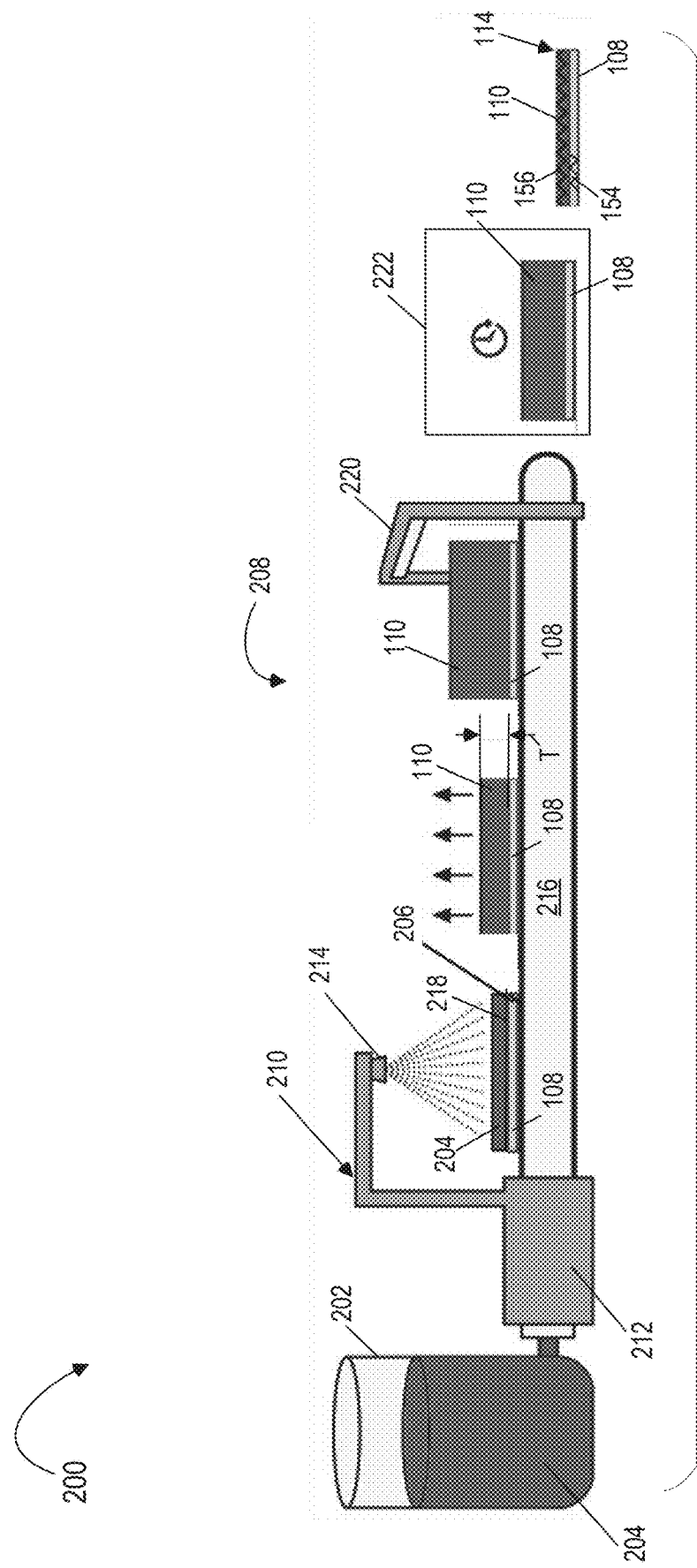
FIG. 9 is a schematic diagram depicting a method of manufacturing an acoustic absorber frame of the computing system of FIGS. 1 and 7, in accordance to some examples of the present disclosure.

For purposes of explanation, certain examples are described with reference to the devices illustrated in FIGS. 1-9. The functionality of the illustrated devices may overlap, however, and may be present in a fewer or greater number of elements and devices. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 8-9 is an example and is not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Such modifications and variations are intended to be included within the scope of this disclosure and protected by the following claims.

With the development of artificial intelligence (AI) technology, edge computing technology, and supercomputing technology, and the like, computing systems, such as a server has an ever increasing demand to quickly process data and store the processed data. Accordingly, the computing system may include a plurality of high-powered electronic devices, such as central processors, graphics processors, rotational drives, such as a hard disk storage drive, and the like, to efficiently process and store the data related to such latest technologies. Since, the computing system tends to have more numbers of the plurality of high-powered electronic devices, the density and the power consumption of the computing system has also increased, which may result in generating a lot of waste-heat by those high-powered electronic devices. The waste-heat may be deterrent to the performance of each high-powered electronic device, if it exceeds a thermal specification of the respective high-powered electronic device. Therefore, the computing system may require efficient cooling mechanisms to absorb the waste-heat produced by the plurality of high-powered electronic devices. Accordingly, the computing system may have a plurality of fans to draw a coolant air for cooling the plurality of high-powered electronics devices, for example, a plurality of rotational drives. In order to efficiently cool the plurality of rotational drives, the plurality of fans may need to operate at its optimal speed. However, operating the plurality of fans at its optimal speed may simultaneously generate louder airborne noise, which may tend to get redirected (reflected or retransmitted) towards the plurality of rotational drives, and thereby affecting functionality of the plurality of rotational drives. In particular, each rotational drive may have a read/write head arm, which may get resonated by the reflected or retransmitted airborne noise at certain frequency. In the resonated state, the read/write head arm may fail to accurately read data from a disc of the rotational drive or write the data in the disc of each rotational drive. Thus, the airborne noise may result in degrading the performance of the rotational drive, if it is not cancelled or absorbed in the chassis of the computing system. Therefore, a key challenge/problem is to maximize the fan efficiency in order to cool the plurality of high-powered electronic devices, such as the plurality of rotational drives, while simultaneously not affect the read and write function of the plurality of rotational drives because of the airborne noise.

To address aforementioned technical issues, examples disclosed herein discuss implementing a computing system having an acoustic absorber frame for absorbing an airborne noise generated by a plurality of fans, while drawing a coolant air for cooling a plurality of rotational drives of the computing system. In some examples, the acoustic absorber frame may include an acoustic absorber coupled to a frame using an adhesive. The acoustic absorber frame may be disposed along a lateral direction of the computing system such that it isolates the plurality of rotational drives from the plurality of fans, and prevents the airborne noise to get redirected (reflected or retransmitted) into the plurality of rotational drives. In such an implementation, the acoustic absorber frame disposed at an inlet of the plurality of fans, may include a plurality of openings to allow each of the plurality of fans to draw a coolant air via a front panel of the computing system, for cooling the plurality of rotational drives.

Accordingly, examples discussed herein absorbs airborne noise which may degrade performance of the rotational drives. Specifically, the plurality of fans may generate louder airborne noise, when it operates at its optimal speed and the generated airborne noise may get directed towards the plurality of rotational drives. While a portion of the airborne noise may get transmitted into the plurality of rotational drives, another portion of the airborne noise may get reflected from the rotational drives. In such examples, the acoustic absorber may absorb the reflected airborne noise from the plurality of rotational drives. In particular, the acoustic absorber may absorb a portion of the reflected airborne noise, thereby preventing the reflected airborne noise to get retransmitted or redirected to the plurality of rotational drives. In some examples, the computing system may further include a pair of additional acoustic absorbers, which may be coupled to a portion of the pair of walls of the computing system, where the portion of the pair of walls may extend between the plurality of rotational drives and the plurality of fans. For example, each of the additional acoustic absorber may extend along a longitudinal direction of the computing system. In such examples, each of the additional acoustic absorber may absorb another portion of the reflected airborne noise. In one or more examples, the acoustic absorber frame may allow a user to operate the plurality of fans at its optimal speed in order to efficiently cool the plurality of rotational drives, while simultaneously absorb the reflected airborne noise, and thereby preventing the performance degradation of the plurality of rotational drives, which otherwise would have occurred due to the retransmission or redirection of the reflected airborne noise.

In some examples, the acoustic absorber and the frame are integrated to (or merged with) one another to form a unitary acoustic absorber frame. In such examples, the frame includes a polymer, and the acoustic absorber includes the polymer having a polyurethane material. In one or more examples, the acoustic absorber is an acoustic foam having a plurality of open cells, which may be used for acoustic treatment, such as attenuating airborne noise and reducing the airborne noise amplitude, for the purposes of airborne noise reduction or airborne noise control. In some other examples, the acoustic absorber is coupled to the frame using adhesive to form an acoustic absorber frame. In such examples, the frame includes a metal, and the acoustic absorber includes the polymer having the polyurethane material.

In one or more examples, each of the plurality of rotational drives may be a hard disk storage drive having a read and write head arm. In one or more examples, the acoustic absorber may be formed directly over the frame as a single step of manufacturing process, to generate the acoustic absorber frame. The single step process of generating the acoustic absorber frame may save manual labor and cost associated with separately attaching the acoustic absorber to the frame as a second step of the manufacturing process.

In one or more examples, a computing system includes a chassis, a plurality of rotational drives, a frame, a first acoustic absorber, and a plurality of fans. The chassis includes a base and a pair of walls coupled to a peripheral side of the base. The plurality of rotational drives is disposed in the chassis. The frame includes a plurality of first openings and the first acoustic absorber includes a plurality of second openings, coupled to the frame to form an acoustic absorber frame. The acoustic absorber frame extends along a lateral direction of the chassis, disposed downstream relative to the plurality of rotational drives, and coupled to the pair of walls. Each second opening is concentrically aligned to a respective first opening. The plurality of fans is disposed downstream relative to the acoustic absorber frame and coupled to the acoustic absorber frame. Each fan is aligned with the respective first opening to draw coolant air via a panel to cool the plurality of rotational drives, while the first acoustic absorber absorbs airborne noise generated by the plurality of fans.

FIG. 1 shows an isometric view of a computing system 100 in accordance to some examples of the present disclosure. In some examples, the computing system 100 may be a compute node or a storage node, or a combination of both.

The computing system 100 may be loaded to a rack of a data center for performing intended functions or providing dedicated services to customers. In the illustrated example of FIG. 1, the computing system 100 is a storage node 101. In some examples, the storage node 101 may include a plurality of high-powered electronic devices, such as one or more processors 102, and a plurality of rotational drives 104 that receives processed data from the one or more processors 102 and/or from a compute node (not shown) loaded in the rack of the data center, and store the processed information in the plurality of rotational drives 104. It may be noted herein that the processed information may relate to one or more applications used by some latest technologies, such as artificial intelligence, edge computing, super-computing, and the like in the compute node. In some other examples, the one or more processors 102 and/or the compute node may access (read) the processed information stored in the plurality of rotational drives 104 for performing the intended functions or providing the dedicated services.

In some examples, the storage node 101 includes other devices, such as a chassis 106, a frame 108, a first acoustic absorber 110, and a plurality of fans 116. The storage node 101 additionally includes some other high-powered electronic devices, for example, a plurality of open compute project (OCP) cards 118, a power supply unit 120, a plurality of dual in-line memory module units (DDIMs) 122, and a plurality of non-volatile memory express (NVMe) devices 124.

The chassis 106 includes a base 126, a pair of walls 128, and panels, for example, a front panel 132 and a back panel 134 (or rear panel). The chassis 106 may additionally include a lid or top cover (not shown in FIG. 1), which may be disposed over the plurality of high-powered electronic devices and coupled to the pair of walls 128. In some examples, the pair of walls 128 is spaced apart from one another and disposed parallel to one other. The pair of walls 128 extends along a longitudinal direction 10 of the storage node 101 and coupled to a peripheral side 130 of the base 126. As defined hereinabove, the longitudinal direction 10 is the direction along which a coolant air flows through the storage node 101, in order to cool the plurality of high-powered electronic devices. In some examples, the pair of walls 128 may be made of a metal. The front panel 132 is disposed at a front side of the storage node 101 and extends along a lateral direction 20 of the storage node 101. In such examples, the front panel 132 is further coupled to front ends 128A of the pair of walls 128. In one or more examples, the front panel 132 includes a display section 138, a plurality of perforations 140, and an electromagnetic induction (EMI) gasket 142 coupled along a perimeter of the display section 138. In such examples, the coolant air (not labeled) may flow into the chassis 106 of the storage node 101 via the plurality of perforations 140 in order to dissipate a waste-heat generated by the plurality of high-powered electronic devices, during the operation of the storage node 101. The EMI gasket 142 protects the plurality of rotational drives 104, for example, the plurality of first rotational drives 104A from electromagnetic interference. Further, the back panel 134 is disposed at a rear side of the storage node 101 and extends along the lateral direction 20 of the storage node 101. In such examples, the back panel 134 is further coupled to rear ends 128B of the pair of walls 128. It may be noted herein that the base 126, the front panel 132, the pair of walls 128, and the back panel 134 are coupled to each other as discussed hereinabove, to form an enclosure of the chassis 106. In such examples, the plurality of high-powered electronic devices and the other devices, such as the frame 108, the first acoustic absorber 110, and the plurality of fans 116 may be disposed within the enclosure to form the storage node 101.

In some examples, the storage node 101 includes a pair of clamps 144, for example, a first clamp 144A and a second clamp 144B. In one or more examples, each clamp of the plurality of clamps 144 is disposed at the front side of the chassis 106 and coupled to the front ends 128A of the pair of walls 128. In such examples, the pair of clamps 144 may be configured to fasten the storage node 101 to the rack of the data center.

In one or more examples, the plurality of rotational drives 104 may include a plurality of first rotational drives 104A, a plurality of second rotational drives 104B, and a plurality of third rotational drives 104C. In some examples, each of the plurality of first, second, and third rotational drives 104A, 104B, 104O respectively may be a hard disk drive or a hard disk storage drive. In such examples, each of the plurality of first, second, and third rotational drives 104A, 104B, 104C respectively, may include at least one read write head arm (not shown), which may read the processed information (data) from a disc (not shown) of a corresponding rotational drive and write the processed data into the disc of the corresponding rotational drive. In the example of FIG. 1, the storage node 101 includes twelve numbers of first rotational drives 104A, which may be arranged in a form of 4×3 matrix at the front side of the chassis 106. It may be noted herein that a first number in the matrix shown above may represent a column and a second number in the matrix shown above may represent a row. Further, in the example of FIG. 1, an intermediate cover 136 is disposed over the plurality of first rotational drives 104A. In one or more examples, the storage node 101 includes twelve numbers of second rotational drives 104B, which may also be arranged in a form of 4×3 matrix and disposed downstream relative to the plurality of first rotational drives 104A. It may be noted herein that only three numbers of second rotational drives 104B is shown in the example of FIG. 1, for ease of illustration and such an illustration should not be construed as a limitation of the present disclosure.

In some examples, the chassis 106 further includes a plurality of support structures 146, which are spaced apart from each other and coupled to at least one of the base 126 and one wall of the pair of walls 128. The plurality of support structures 146 extends along the longitudinal direction 10 to define a plurality of partitions 148 there between a pair of mutually adjacent support structures 146A, 146B of the plurality of support structures 146. Further, each of the mutually adjacent support structures 146A, 146B may include a plurality of guide rails 150. In such examples, the plurality of rotational drives 104 may be disposed in a stacked configuration within each partition 148 and coupled to the pair of mutually adjacent support structures 146A, 146B via the plurality of guide rails 150. For example, each of the plurality of second rotational drives 104B slides in a mutually adjacent guide rails of the plurality of guide rails 150 so as to attach to the pair of mutually adjacent support structures 146A, 146B. In the example of FIG. 1, each of the plurality of partitions 148 includes three numbers of the second rotational drives 104B, which are disposed one above other with a gap (not shown) there between. In other words, the plurality of second rotational drives 104B is arranged in a form of 1×3 matrix in each of the plurality of partitions 148.

The storage node 101 further includes another high-powered electronic device, for example, a circuit card 152 (or a back plane), which is coupled to the plurality of support structures 146 and communicatively coupled to the plurality of rotational drives 104, for example, to the plurality of second rotational drives 104B. In the example of FIG. 1, the circuit card 152 is disposed upstream relative to the frame 108 and extends along the lateral direction 20. In other words, the circuit card 152 is disposed downstream relative to the plurality of second rotational drives 104B. As defined hereinabove, the lateral direction 20 is the direction which is perpendicular to the direction in which the coolant air flows through the storage node 101. The circuit card 152 may include a plurality of peripheral component interconnect express (PCIe) connectors (not shown) and a plurality of third openings 158 to allow the flow of the coolant air from the front panel 132. It may be noted herein that the term "a plurality of third openings" has been used prior to the term "a plurality of first and second openings" to maintain consistency between the usage to terms in the specification and claims. It may be noted herein that the circuit card 152 is discussed in greater details below.

Figure 2:
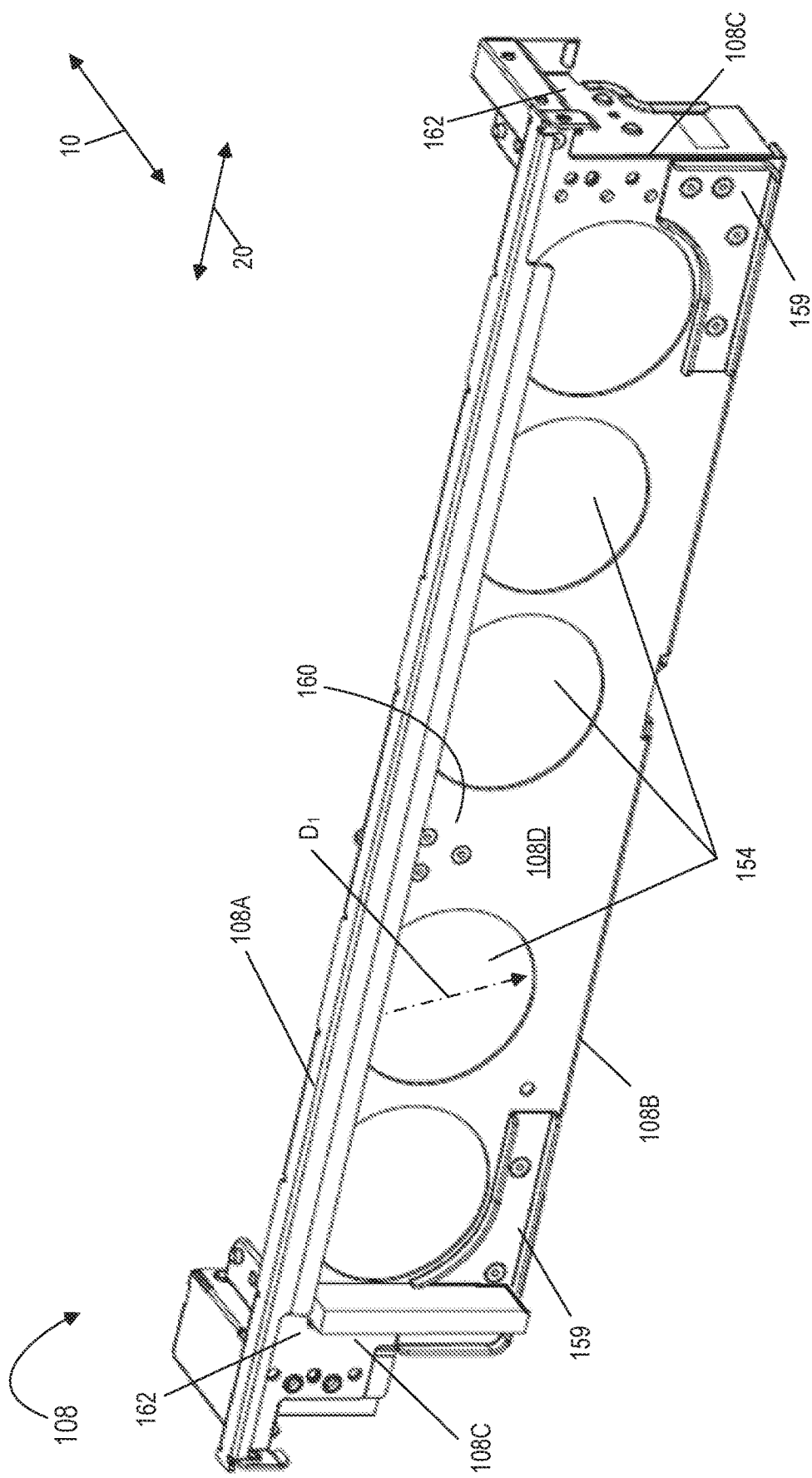
FIG. 2 illustrates an isometric view of a frame, in accordance to some examples of the present disclosure.

In one or more examples, the frame 108 is a mechanical support structure, which holds the plurality of fans 116 and includes a plurality of first openings 154 (as shown in FIG. 2) to allow the flow of the coolant air from the front panel 132, and the plurality of third and second openings 158, 156 respectively. In some examples, the frame 108 is made of a metal. In some other examples, the frame 108 is made of a polymer.

Figure 3:
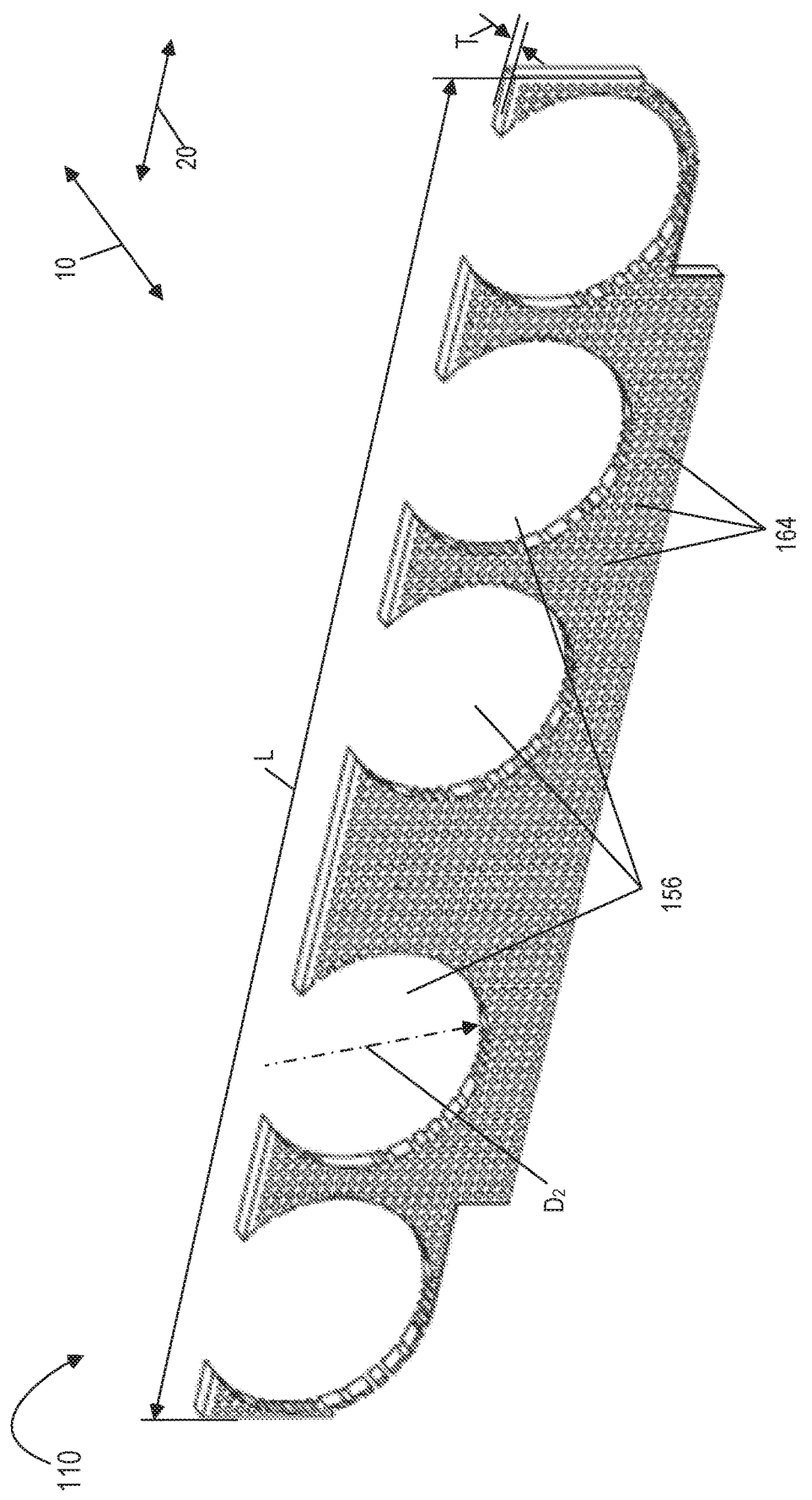
FIG. 3 illustrates an isometric view of an acoustic absorber, in accordance to some examples of the present disclosure.

In one or more examples, the first acoustic absorber 110 is designed to absorb airborne noise in the chassis 106, and includes a plurality of second openings 156 (as shown in FIG. 3) to allow the flow of the coolant air from the front panel 132 and the plurality of third openings 158. In one or more examples, the first acoustic absorber 110 absorbs about "80" percent of the portion of reflected airborne noise having a frequency in a range from about "1000" hertz to about "4000" hertz.

Figure 4:
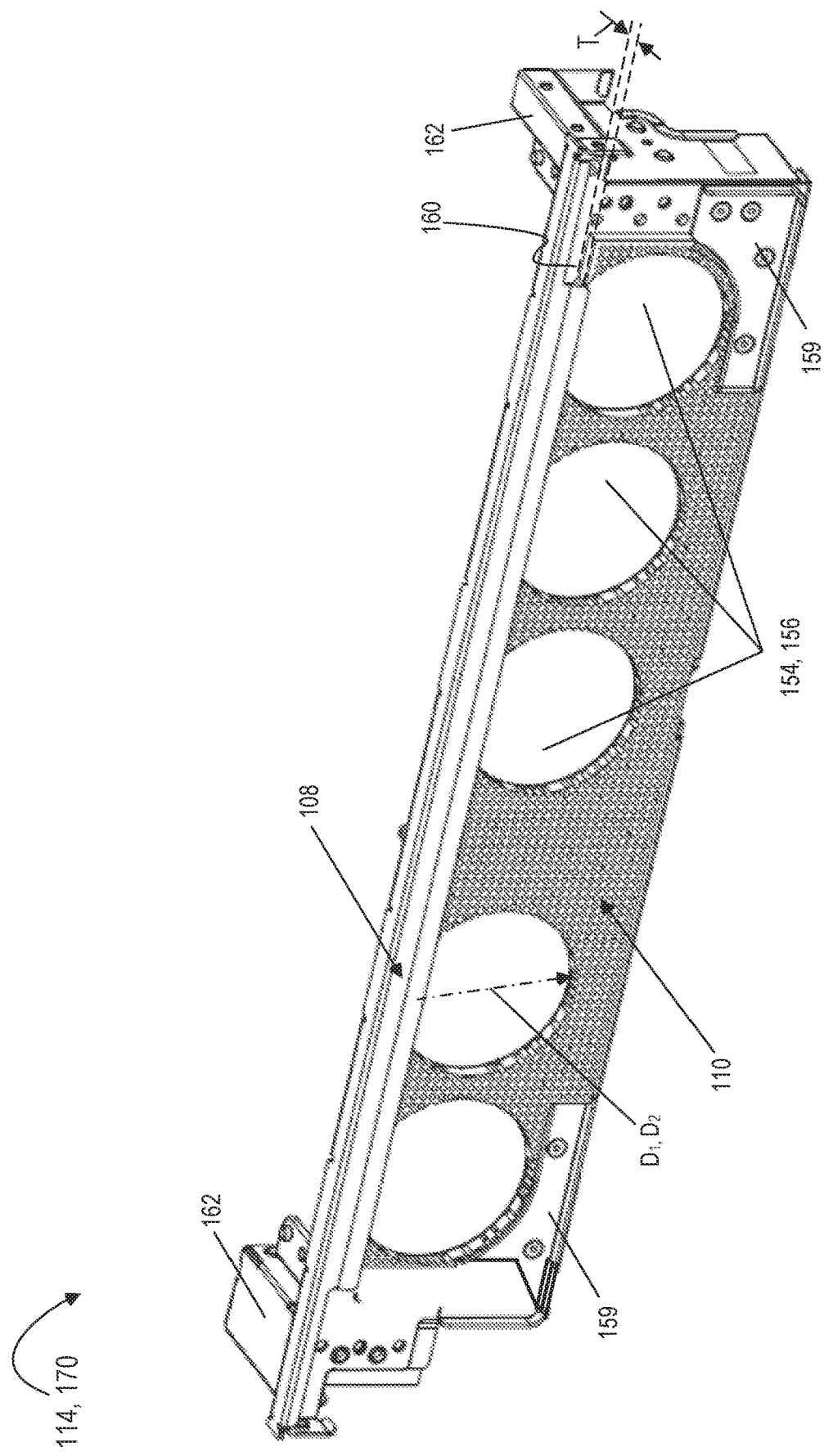
FIG. 4 illustrates an isometric view of an acoustic absorber frame, in accordance to some examples of the present disclosure.

In some examples, the first acoustic absorber 110 is coupled to the frame 108 to form an acoustic absorber frame 114 (as shown in FIG. 4). In such examples, the acoustic absorber frame 114 may be disposed downstream relative to the plurality of rotational drives 104, for example, the plurality of second rotational drives 104B and the circuit card 152. Further, the acoustic absorber frame 114 extends along the lateral direction 20 of the chassis 106 and coupled to the pair of walls 128. In one or more examples, the plurality of high-powered electronic devices, such as the plurality of first rotational drives 104A, the plurality of second rotational drives 104B, the circuit card 152, and the other devices, such as the front panel 132 and the acoustic absorber frame 114 may be referred to as a "plurality of upstream devices" of the storage node 101. It may be noted herein that the frame 108, the first acoustic absorber 110, and the acoustic absorber frame 114 are discussed in greater details below.

The plurality of fans 116 is disposed downstream relative to the acoustic absorber frame 114 and coupled to the frame 108. In some examples, each fan of the plurality of fans 116 is a suction fan. In one or more examples, an inlet of each of the plurality of fans 116 is oriented such that it faces the front panel 132 and aligned to a corresponding first, second, and third openings 154, 156, 158 respectively.

During operation of the storage node 101, the plurality of fans 116 may draw the coolant air from an outside environment (not labeled) into the chassis 106 via the front panel 132, the plurality of first and second rotational drives 104A, 104B, the circuit card 152, and the acoustic absorber frame 114. In other words, the plurality of fans 116 may draw the coolant air into the chassis 106 in order to cool each upstream device and generate a substantially hot air.

The plurality of third rotational drives 104C is disposed downstream relative to the plurality of fans 116. In the example of FIG. 1, the storage node 101 includes four numbers of third rotational drives 104C, which may be arranged in a form of 4×1 matrix. In such examples, the one or more processors 102 and the plurality of DIMMs 122 of the storage node 101 may be arranged adjacent to one another and disposed below the plurality of third rotational drives 104C. In some examples, the one or more processors 102 and the plurality of DDIMs 122 may be directly plugged to a mother board (not shown) of the storage node 101.

The plurality of OCP cards 118, the power supply unit 120, and the plurality of NVMe devices 124 are disposed proximate to the rear side of the chassis 106. In other words, the plurality of OCP cards 118, the power supply unit 120, and the plurality of NVMe devices 124 are disposed downstream relative to the plurality of third rotational drives 104C. In such examples, the power supply unit 120 may be coupled to the plurality of high-powered electronic devices to supply power to each of those devices. The OCP cards 118 may be communicatively coupled to the plurality of rotational drives 104 and the plurality of NVMe devices 124 to enable network connection between the storage node 101 and the compute node of the rack. The plurality of NVMe devices 124 may function as a buffer storage in order to speed up the data or information transfer rate among the storage node 101 and the compute node. In one or more examples, the plurality of high-powered electronic devices, such as the plurality of third rotational drives 104C, the plurality of OCP cards 118, and the plurality of NVMe devices 124, and the other devices, such as the power supply unit 120 may be referred to as a "plurality of downstream devices" of the storage node 101.

During operation of the storage node 101 the plurality of fans 116 may discharge the hot air to flow along a plurality of downstream devices via an outlet of the respective fan in order to further cool each downstream device before the coolant air exits the chassis 106 via the back panel 134. It may be noted herein that the plurality of fans 116 and a method of drawing the coolant air with the plurality of fans 116 are discussed in greater details below.

FIG. 2 shows an isometric view of a frame 108 of FIG. 1 in accordance to some examples of the present disclosure. In some examples, the frame 108 may be construed using multiple support elements. For example, the frame 108 includes a top support element 108A, a bottom support element 108B, a pair of peripheral support elements 108C, and a support sheet 108D connected to the top, bottom, and peripheral support elements 108A, 108B, 108C respectively. In the example of FIG. 2, the support sheet 108D includes a plurality of first openings 154 spaced apart from one another along a lateral direction 20. In some examples, each of the plurality of first openings 154 is a circular opening having a first diameter "$D_1$". In some other examples, at least one opening of the plurality of first openings 154 may be a non-circular opening. The support sheet 108D may have an upstream surface 160 and a downstream surface (not shown) located opposite to the upstream surface 160. In one example, the frame 108 may further include clamping structures 159 coupled to the pair of peripheral support elements 108C, the bottom support element 108B, and the support sheet 108D for holding a pair of longitudinal support walls 162. In some examples, the pair of longitudinal support walls 162 may be used to couple the frame 108 to the pair of walls 128 (as shown in FIG. 1) and to the plurality of fans 116 (as shown in FIG. 1). In some example, the frame 108 is made of a metal. In some other examples, the frame 108 may be made of a polymer.

FIG. 3 shows an isometric view of a first acoustic absorber 110 of FIG. 1 in accordance to some examples of the present disclosure. In some examples, the first acoustic absorber 110 is an acoustic foam. In such examples, the acoustic foam may include a polymer having a polyurethane material. The first acoustic absorber 110 may include a plurality of open cells 164 disposed along a thickness "T" and length "L" of the first acoustic absorber 110. In some examples, the thickness "T" may be about "2.5" millimeters and the length "L" may be substantially equal to a width of the chassis. In such examples, the plurality of open cells 164 may allow airborne noise impacted on its surface to pass through it. In particular, the airborne noise may get transmitted from one cell to another cell along the thickness "T", thereby dissipating/absorbing the airborne noise rather than reflecting the airborne noise from the impacted surface of the first acoustic absorber 110. In the example of FIG. 3, the first acoustic absorber 110 includes a plurality of second openings 156 spaced apart from one another along a lateral direction 20. In some examples, each of the plurality of second openings 156 is a circular opening having a second diameter "$D_2$". In some other examples, at least one opening of the plurality of second openings 156 may be a non-circular opening. Further, the first acoustic absorber 110 may conform to a shape of the upstream surface 160 of the support sheet 108D (as shown in FIG. 2).

FIG. 4 shows an isometric view of an acoustic absorber frame 114 in accordance to one or more examples of the present disclosure.

As discussed hereinabove, a first acoustic absorber 110 is coupled to a frame 108 to form the acoustic absorber frame 114. For example, the first acoustic absorber 110 is first arranged over an upstream surface 160 of the frame 108 such that each of the second opening 156 is concentrically aligned to a respective first opening 154. Later, the first acoustic absorber 110 is coupled to the frame 108 using an adhesive. In some examples, the adhesive may include polyurethane acrylate material. In such examples, the frame 108 is made of metal and the first acoustic absorber 110 is an acoustic foam. In such examples, the acoustic foam is made of a polymer having a polyurethane material. In some examples, the first diameter "$D_1$" of each first opening 154 is substantially equal to the second diameter "$D_2$" of each second opening 156. In some other examples, the first diameter "$D_1$" may be different than the second diameter "$D_2$" to regulate the flow of the coolant air.

Figure 5:
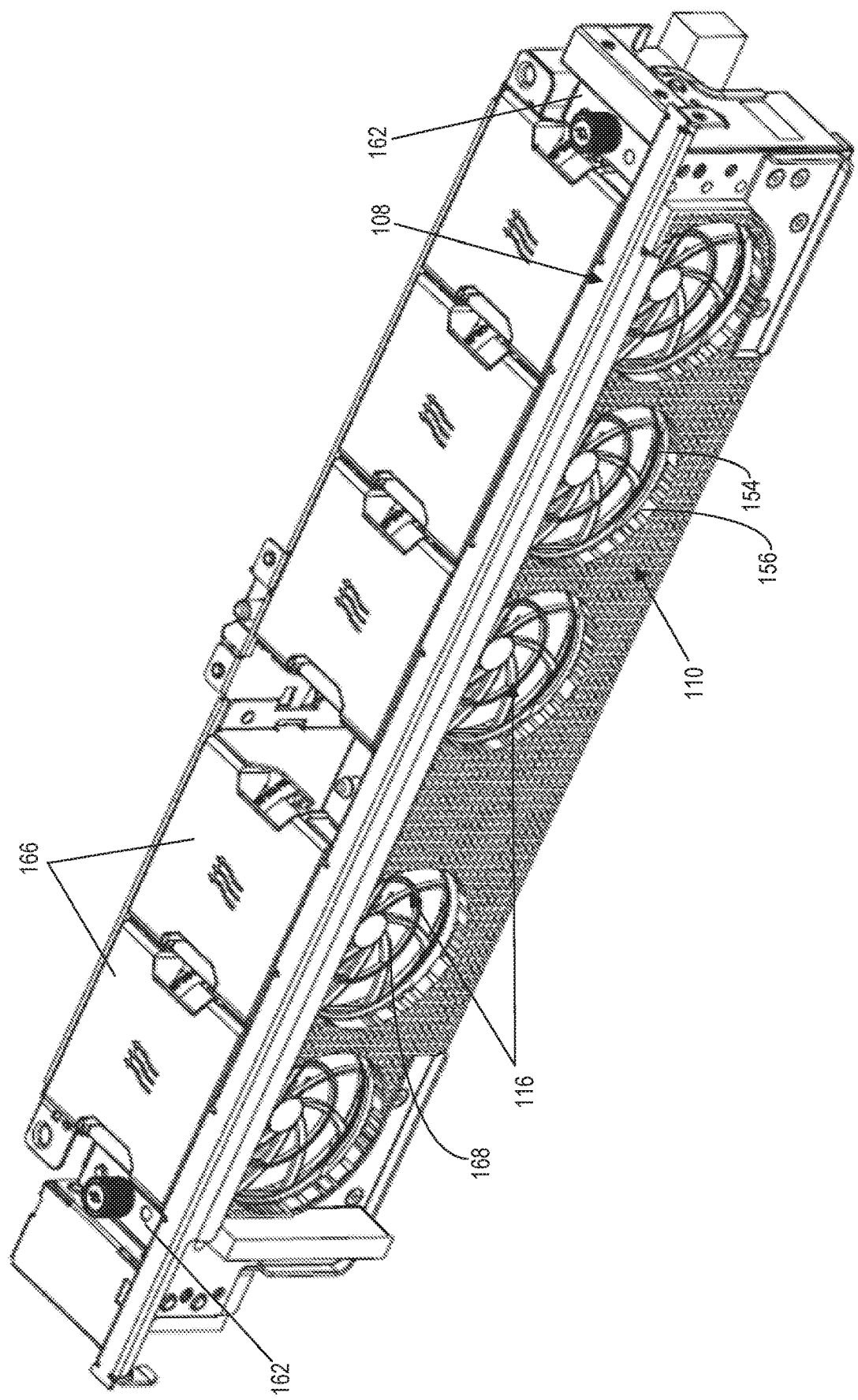
FIG. 5 illustrates an isometric view of a plurality of fans and an acoustic absorber frame, in accordance to some examples of the present disclosure.

In certain other examples, the first acoustic absorber 110 is directly bound to the frame 108 to form a unitary acoustic absorber frame 170. In other words, the first acoustic absorber 110 and the frame 108 are merged with one another to form a unitary acoustic absorber frame 170. In such examples, the frame 108 may be made of the polymer, and the first acoustic absorber 110 having the acoustic foam may be made of the polymer having the polyurethane material. In such examples, during manufacturing process the first acoustic absorber 110 may directly bind to the upstream surface 160 of the frame 108 to form the unitary acoustic absorber frame 170, FIG. 5 shows an isometric view of an acoustic absorber frame 114 and a plurality of fans 116 in accordance to some examples of the present disclosure. As discussed hereinabove with respect to FIG. 4, the acoustic absorber frame 114 includes a frame 108 and a first acoustic absorber 110 coupled to an upstream surface 160 of the frame 108. In such examples, the pair of longitudinal support walls 162 of the frame 108 is coupled to the plurality of fans 116 so as to securely hold each of the plurality of fans 116. In one or more examples, each fan of the plurality of fans 116 includes an inlet 168 and an outlet (not shown in FIG. 5). In such examples, the inlet 168 of each fan 116 is aligned with the respective first opening 154 of the frame 108 to draw a coolant air via a front panel 132 (as shown in FIG. 1) of a chassis 106 in order to cool the plurality of rotational drives 104 (as shown in FIG. 1) and generate a substantially hot air. Further, the outlet of each fan 116 is configured to discharge the hot air to a plurality of downstream devices, as discussed hereinabove with respect to FIG. 1. In the example of FIG. 5, each of the plurality of fans 116 further includes a top cover 166 to cover the respective fan 116. In some examples, each fan of the plurality of fans 116 is a suction fan.

As discussed herein with respect to FIGS. 2-4, in some examples, the acoustic absorber frame 114 is made of a metal. In such examples, each of the plurality of fans 116 is also made of the metal. In certain other examples, the unitary acoustic absorber frame 170 may be made of the polymer. In such examples, each of the plurality of fans 116 may also be made of the polymer.

Figure 6:
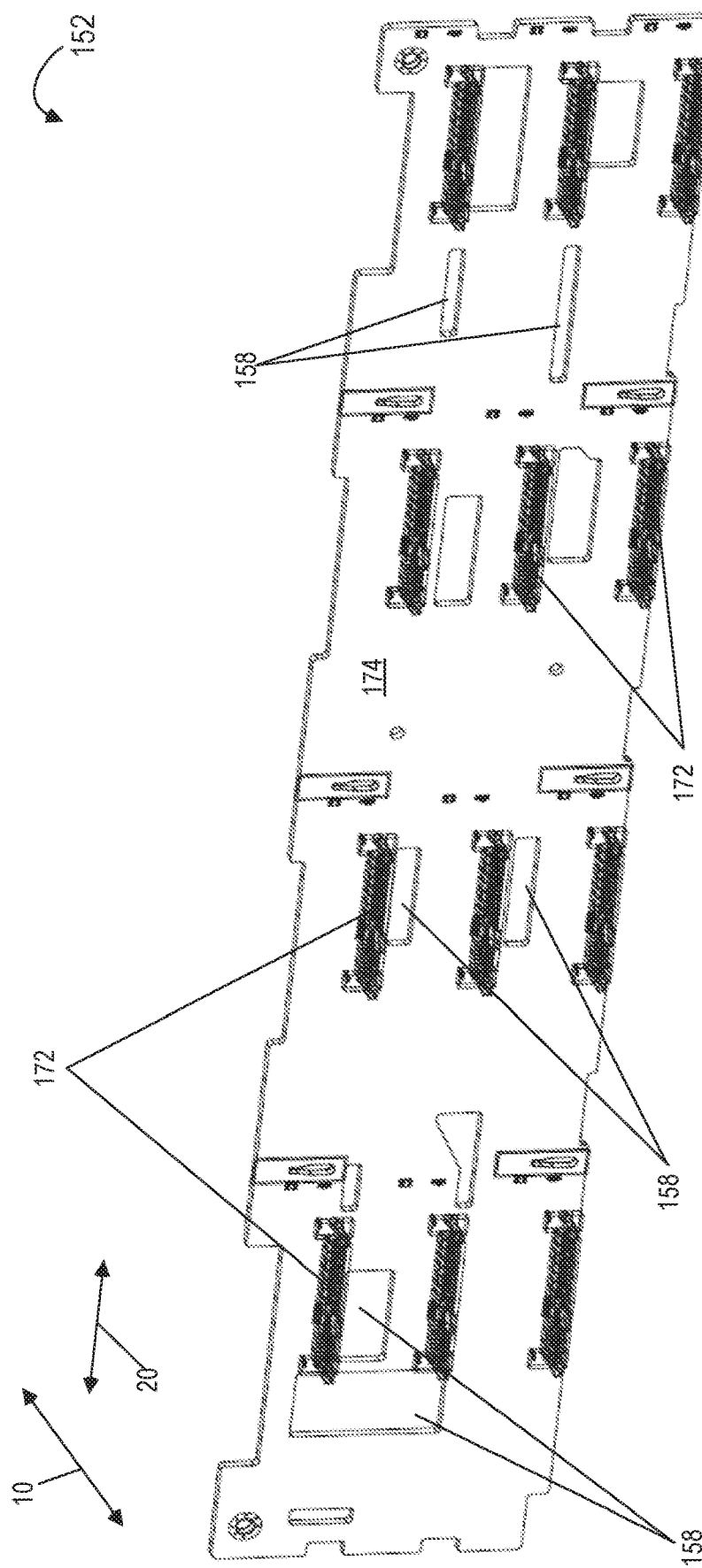
FIG. 6 illustrates an isometric view of a circuit card, in accordance to some examples of the present disclosure.

FIG. 6 shows an isometric view of a circuit card 152 in accordance to some examples of the present disclosure. In some examples, the circuit card 152 includes a plurality of peripheral component interconnect express (PCIe) connectors 172 and a plurality of third openings 158. In some examples, the circuit card 152 is a printed circuit board, which may include traces embedded in a semiconductor body 174 of the circuit card 152, and connected to the plurality of PCIe connectors 172. In the example of FIG. 6, the circuit card 152 includes twelve numbers of the PCIe connectors 172, which are arranged in a form of 4×3 matrix. Each of the plurality of PCIe connectors 172 may be inserted or plugged into a respective PCIe socket (not shown) of a respective second rotational drives 104B (as discussed in FIG. 1) to communicatively couple the respective PCIe connector to the respective rotational drive 104. The plurality of third openings 158 are formed on the semiconductor body 174 and spaced apart from each other along a lateral direction 20. In the example of FIG. 6, each of the plurality of third openings 158 has non-circular shape. In some other examples, at least some of the plurality of third openings 158 may have a circular shape and concentrically aligned with the respective second opening 156. In some examples, the plurality of third openings 158 is aligned to the respective second opening 156 to allow the flow of the coolant air from the front panel 132 into the inlet 168 of the respective fan of the plurality of fans 116 via the plurality of second and first openings 156, 154 respectively. In such examples, the flow of the coolant air via the front panel 132 may cool the plurality of first and second rotational drives 104A, 104B and the circuit card 152 before flowing into the inlet 168. The circuit card 152 may further include connector mechanisms, such as a plurality of fasteners holes to allow the circuit card 152 to be physically coupled a plurality of support structures 146, as shown in FIG. 1.

Figure 7:
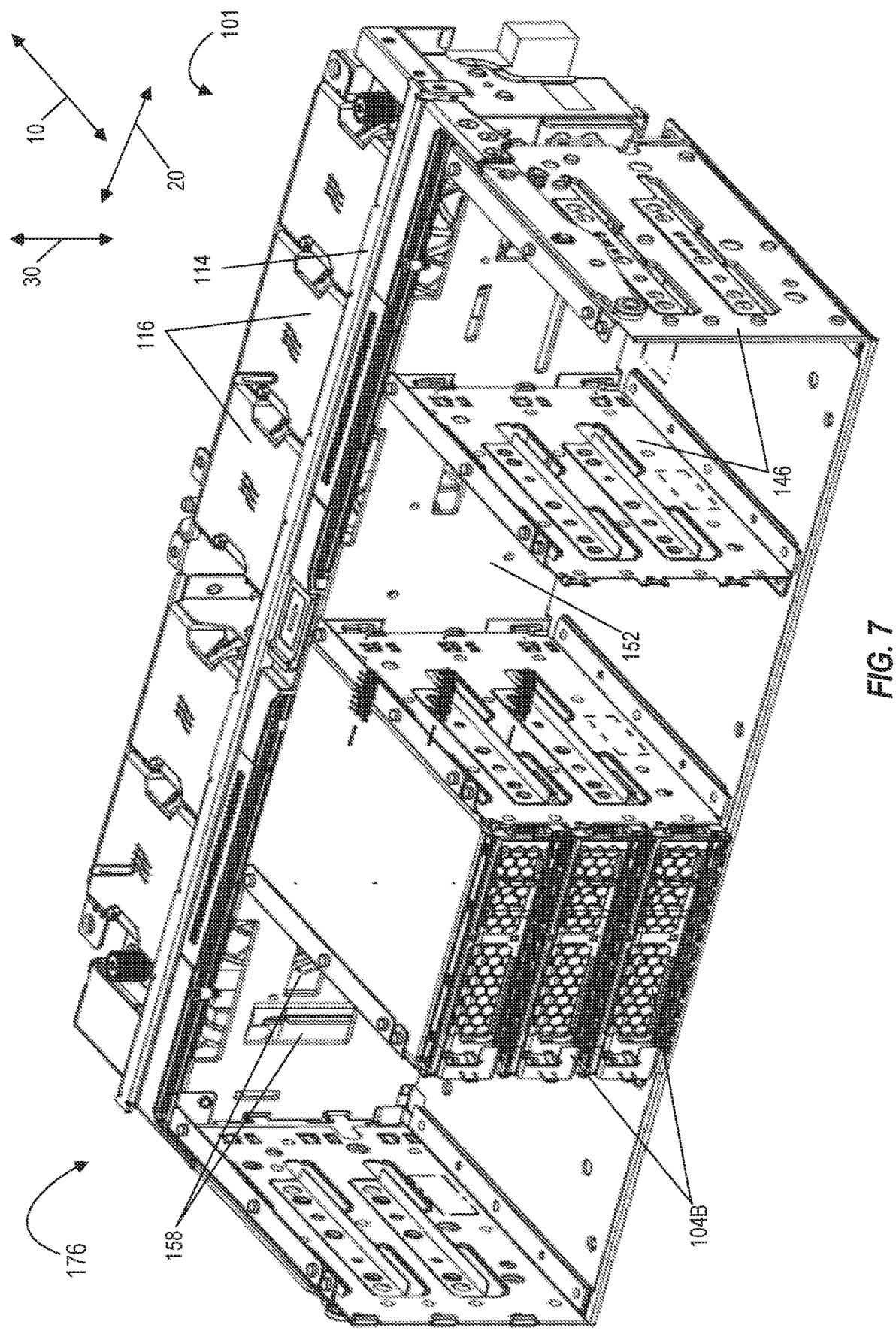
FIG. 7 illustrates an isometric view of a portion of the computing system of FIG. 1, in accordance to some examples of the present disclosure.

FIG. 7 shows an isometric view of a portion 176 of a storage node 101 in accordance to some examples of the present disclosure. The portion 176 of the storage node 101 includes a plurality of second rotational drives 104B, the acoustic absorber frame 114, a plurality of fans 116, and the circuit card 152. As discussed in the example of FIG. 1, the plurality of second rotational drives 104B is stacked one above another along a radial direction 30 of the storage node 101. Further, the circuit card 152 is disposed downstream relative to the plurality of second rotational drives 104B, extends along a lateral direction 20 of the storage node, and coupled to the plurality of support structures 146. The circuit card 152 is further communicatively coupled to plurality of second rotational drives 104B. Further, the circuit card 152 includes a plurality of third openings 158. The acoustic absorber frame 114 is disposed downstream relative to the plurality of second rotational drives 104B and the circuit card 152 such that a gap "$G_1$" (as shown in FIG. 8) is formed there between the circuit card 152 and the acoustic absorber frame 114. The acoustic absorber frame 114 extends along the lateral direction 20 and may be coupled to a pair of walls 128 (as shown in FIG. 1). As discussed in the examples of FIG. 4, the acoustic absorber frame 114 is formed by coupling a first acoustic absorber 110 (as shown in FIG. 4) to a frame 108 (as shown in FIG. 4) using an adhesive. In some other examples, the acoustic absorber frame 114 may be a unitary acoustic absorber frame 170, which may be formed by integrating the first acoustic absorber 110 and the frame 108 to one another, as discussed in the example of FIG. 4. In one or more examples, the frame 108 includes a plurality of first openings 154 (as shown in FIG. 4) and the first acoustic absorber 110 includes a plurality of second openings 156 (as shown in FIG. 4). In such examples, each second opening 156 is concentrically aligned to a respective first opening 154. Further, each third opening 158 is further aligned with the respective second opening 156. The plurality of fans 116 is further disposed downstream relative to the acoustic absorber frame 114. In one or more examples, an inlet 168 (as shown in FIG. 5) of each fan of the plurality of fans 116 is aligned with the respective first, second, and third openings 154, 156, 158 respectively, to draw a coolant air via a front panel 132 (as shown in FIG. 1) of a chassis 106 (as shown in FIG. 1). In some examples, the coolant air may be used to cool the plurality of rotational drives 104, for examples, the plurality of second rotational drives 104B and the circuit card 152. In one or more examples, the first acoustic absorber 110 may absorb airborne noise, which may have generated by the plurality of fans 116, while drawing the coolant air into the chassis 106. The process of cooling the plurality of second rotational drives 104B using the coolant air and absorbing the airborne noise by the first acoustic absorber 110 are described in greater details with reference to example of FIG. 8.

FIG. 8 is a schematic diagram depicting a top view of a portion of a storage node 101 of FIGS. 1 and 7 and a method of cooling a plurality of rotational drives 104 and absorbing airborne noise in the storage node 101 in accordance to some examples of the present disclosure.

In some examples, the portion 176 of the storage node 101 includes a pair of walls 128 of a chassis, a plurality of second rotational drives 104B, a circuit card 152, an acoustic absorber frame 114, a plurality of fans 116, and a pair of second acoustic absorbers 112. The plurality of second rotational drives 104B is coupled to a plurality of support structures and communicatively coupled to the circuit card 152, as discussed in FIGS. 1 and 7. The plurality of fans 116 is downstream relative to the plurality of rotational drives 116 and coupled to the acoustic absorber frame 114, as discussed in FIGS. 1 and 7. The acoustic absorber frame 114 is disposed downstream relative to the plurality of second rotational drives 104B and the circuit card 152 so as to maintain a gap "G1" there between the circuit card 152 and the acoustic absorber frame 114. In other words, the acoustic absorber frame 114 is disposed in between the plurality of fans 116 and the plurality of second rotational drives 104B. Further, as discussed in FIGS. 1 and 7, the first acoustic absorber 110 is coupled to the frame 108 to form the acoustic absorber frame 114. In such examples, an inlet of each fan is aligned to the first, second, and third openings 154, 156, 158 (as shown in FIGS. 4 and 6) of the frame 108, the first acoustic absorber 110, and the circuit card 152 respectively. Further, the pair of second acoustic absorbers 112 is coupled to a portion of the pair of walls 128 using an adhesive. For example, the pair of second acoustic absorbers 112 extends to cover the gap "$G_1$". In such examples, the pair of walls 128 includes a metal and the pair of second acoustic absorbers 112 is an acoustic foam. In one or more examples, the acoustic foam includes a polymer having a polyurethane material. As discussed in the embodiment of FIG. 3, each of the pair of second acoustic absorber 112 may also have a thickness of about "2.5" millimeters. In such examples, the pair of second acoustic absorbers 112 may absorb about "80" percent of the other portion of reflected airborne noise having a frequency in a range from about "1000" hertz to about "4000" hertz.

In one or more examples, each of the first acoustic absorber 110 and the pair of second acoustic absorbers 112 may be designed based on the equation below.

$$\alpha = \frac{(Ei - Er)}{Ei}$$

where "$\alpha$" is absorption coefficient, "Ei" is airborne noise impacting the acoustic absorber, and "Er" is airborne noise reflected from the acoustic absorber. In one or more examples, each of the first acoustic absorber 110 and the pair of second acoustic absorbers 112 having the predefined thickness "T" of about "2.5" millimeters may absorb about "80" percent of the reflected airborne noise having a frequency in a range from about "1000" hertz to about "4000" hertz.

During operation of the storage node 101, the plurality of high-powered electronic devices, for example, the plurality of second rotational drives 104B may generate a lot of waste-heat. In such examples, the waste-heat has to be dissipated in order to cool the plurality of second rotational drives 104B. In some examples, the plurality of fans 116 may draw a coolant air 178 through a panel, for example, a front panel 132 (as shown in FIG. 1) of a chassis, in order to cool the plurality of second rotational drives 104B. In some examples, for efficient cooling of the plurality of rotational drives 104, the plurality of fans 116 may need to operate at an optimal speed, such that it can draw a large quantity of the coolant air 178 into the chassis for cooling the plurality of rotational drives 104. However, operating the plurality of fans 116 at the optimal speed may result in simultaneously generating airborne noise 180. In such examples, the airborne noise 180 may get directed from the plurality of fans 116 towards the plurality of second rotational drives 104B, as shown by reference numeral 182. In one or more examples, the directed airborne noise 182 may impact the circuit card 152 and/or the plurality of second rotational drives 104B. In such examples, a portion of the directed airborne noise 182 gets reflected as a portion of reflected air borne noise 186 and another portion of the reflected air borne noise 188, 190 from the plurality of second rotational drives 104B. Further, another portion of the directed airborne noise 182 may get transmitted into the circuit card 152 and the plurality of second rotational drives 104B, as shown by reference numeral 184.

In accordance to one or more examples of the present disclosure, the first acoustic absorber 110 may absorb the portion of reflected airborne noise 186 in order to prevent a redirection (or retransmission) of the portion of the reflected airborne noise 186 from the frame 108 and/or the plurality of fans 116. Similarly, the pair of second acoustic absorbers 112 may absorb the other portion of the reflected airborne noise 188, 190 in order to prevent a redirection (or retransmission) of the other portion of the reflected airborne noise 188, 190 from the pair of walls 128. Thus, the first acoustic absorber and the pair of second acoustic absorbers 112 may reduce a performance degradation of the plurality of second rotational drives 104B, which may have otherwise caused due to redirection or retransmission of the reflected airborne noise 186, 188, 190 into the plurality of second rotational drives 104B.

Since the first acoustic absorber 110 and the pair of second acoustic absorbers 112 absorbs the reflected airborne noise, it may prevent the read/write head arm to get resonated by the reflected and/or retransmitted airborne noise. Thus, help the read/write head arm to accurately read data from a disc of the rotational drive or write the data in the disc of each rotational drive, while allowing the plurality of fans 116 to operate at the optimal speed without degrading the performance of the plurality of rotational drives 104.

In some examples, the coolant air 178 may become a sustainably hot air 192 after dissipating heat from the plurality of upstream devices, such as the plurality of rotational drives 104 and the circuit card 152. In such examples, the plurality of fans 116 may discharge the substantially hot air 192 to the plurality of downstream devices, as discussed in FIG. 1, via an outlet so as to cool each of the plurality of downstream devices before the hot air 192 exits the storage node 101 via the back panel 134 (as shown in FIG. 1).

FIG. 9 is a schematic diagram depicting a method 200 of manufacturing an acoustic absorber frame 114 of the storage node 101 of FIGS. 1 and 7, in accordance to some examples of the present disclosure.

In one or more examples, the method includes a step of mixing isocyanate and polyol materials along with water in a container 202, to form a mixture 204 of acoustic absorber materials. In some examples, the isocyanate and polyol materials are mixed in sequence along with water to form the mixture 204.

The method 200 further includes disposing a frame 108 (as shown in FIGS. 1 and 2) on a support base 206 of a manufacturing unit 208. In some examples, the manufacturing unit 208 may include a sprayer assembly 210 fluidically coupled to the container 202 via a conduit 212, where the sprayer assembly 210 may include a sprayer 214. The manufacturing unit 208 may further include a conveyor belt 216 having the support base 206. In some examples, the frame 108 includes a plurality of first openings 154 (as shown in FIG. 2), which are pre-formed on a support sheet 108D (as shown in FIG. 2) of the frame 108. It may be noted herein that the frame 108 is disposed on the support base such that an upstream surface 160 of the support sheet 108D faces the sprayer 214. In some other examples, the frame 108 may not have the plurality of pre-formed first openings, when it is disposed on the support base 206 of the manufacturing unit 208.

Further, the method 200 includes spraying the mixture 204 over the frame 108 using the sprayer 214. In some examples, the method 200 may include a pre-step of applying a layer of an adhesive 218 on the upstream surface 160 of the support sheet 108D prior to spraying the mixture 204.

In such examples, the adhesive 218 is a polyurethane acrylate material. It may be noted herein that the adhesive 218 is selected such that it is capable of withstanding a temperature of over 100 degree centigrade without degradation. In some examples, the frame 108 may be made of metal.

In some other examples, the frame 108 may be made of a polymer material. In such examples, the step of applying the layer of the adhesive 218 on the upstream surface 160 of the support sheet 108D is not essential or required. In such examples, the mixture 204 may be directly sprayed over the upstream surface 160 of the support sheet 108D.

Further, the method 200 includes a step of moving the conveyor belt 216 so as to move the frame 108 having the layer of the adhesive 218 and the mixture 204 away from the sprayer 214. Later, the method 200 includes the step of producing an acoustic absorber frame 114 (as shown in FIG. 4) by allowing the mixture 204 to bind with the frame 108 via the adhesive 218, and raise to a predefined thickness "T". In some examples, the mixture 204 may be allowed to for about 10" minutes to bind with the frame and have the predefined thickness "T" of about "2.5" millimeters. For example, the mixture 204 may react to bind with the frame 108 via the adhesive 218 to form a first acoustic absorber 110 (as shown in FIG. 3) on the frame 108. In some examples, the first acoustic absorber 110 is an acoustic foam. In one or more examples, the acoustic foam is a polymer having a polyurethane material. In some examples, the first acoustic absorber 110 may include a plurality of open cells 164 (as shown in FIG. 3) arranged along a thickness "T" of the first acoustic absorber 110. Further, the plurality of open cells 164 may also be arranged spaced apart from one another along a lateral direction of the first acoustic absorber 110. In some examples, the predefined thickness "T" may be decided by the user depending on a prior analysis of the airborne noise level in the storage node and the absorption coefficient is designed to absorb around "80" percent of the reflected airborne noise in the storage node. In some other examples, where the frame 108 is made of the polymer, the mixture 204 may react to directly bind (or merge) with the frame 108 and form a unitary acoustic absorber 170 (as shown in FIG. 4) having the frame 108 and the first acoustic absorber 110. In other words, the first acoustic absorber 110 and the frame 108 may be merged with one another to form the unitary acoustic absorber 170.

The method 200 may further include the step of trimming the first acoustic absorber 110 along a plurality of peripheral sides of the acoustic absorber frame 114. For example, the first acoustic absorber 110 raised along a portion of the bottom support element 108B and the pair of peripheral support elements 108C are trimmed off so as to make provisions for acoustic absorber frame 114 to the include clamping structures 159 (as shown in FIGS. 2 and 4). In some examples, the manufacturing unit 208 may include a milling machine 220 to trim the plurality of peripheral sides of the acoustic absorber frame 114.

Further, the method 200 includes offloading the acoustic absorber frame 114 from the conveyer belt 216 and allowing the acoustic absorber frame 114 to cure at a predefined temperature for a predefined period of time. In some examples, the predefined temperature may be about "115" to "155" degree centigrade and the predefined period of time may be around "60" to "90" minutes. In such examples, the acoustic absorber frame 114 may be positioned within an oven 222, such as gas-fired oven or dry-air oven to cure the acoustic absorber frame 114.

The method 200 further includes a step of forming a plurality of openings in the acoustic absorber frame 114 using a drilling and/or a stamping machine (not shown). In some examples, the frame 108 has a plurality of first openings 154, which is pre-formed in the frame 108. In such examples, the step of forming the plurality of openings in the acoustic absorber frame 114 includes forming a plurality of second openings 156 in the first acoustic absorber 110 such that each second opening 156 is concentrically aligned with a respective first opening 154. In some other examples, the step of forming the plurality of openings in the acoustic absorber frame 114 includes forming a plurality of second openings 156 in the first acoustic absorber 110 and a plurality of first openings 154 in the frame 108 such that each second opening 156 is concentrically aligned with a respective first opening 154.

The method 200 may further include disposing the acoustic absorber frame 114, which is manufactured as discussed above, in between a plurality of rotational drives 104 and a plurality of fans 116 (as shown FIG. 1) of a chassis, and coupling the acoustic absorber frame 114 to a pair of walls 128 (as shown in FIG. 1) of the chassis. It may be noted herein that the acoustic absorber frame 114 may extend along a lateral direction of the chassis. In some examples, the method 200 may further includes coupling a pair of second acoustic absorbers 112 to a portion of the pair of walls 128 using an adhesive 218. In such examples, the pair of walls 128 is made of metal and the pair of second acoustic absorbers 112 is the acoustic foam. In some examples, the acoustic foam includes a polymer having a polyurethane material. Since the first acoustic absorber 110 is formed directly over the frame 108 as a single step of manufacturing process as discussed hereinabove, to generate the acoustic absorber frame 114, it may save additional labor and cost associated with separately attaching the first acoustic absorber 110 to the frame 108 as a second step of the manufacturing process, if the frame 108 and the first acoustic absorber are manufactured separately.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations,

What is claimed is:
1. A computing system comprising:
a chassis comprising a base and a pair of walls coupled to a peripheral side of the base;
a plurality of rotational drives disposed in the chassis;
an acoustic absorber frame comprising:
a frame comprising a support sheet, a pair of support walls spaced apart from each other and extending from the support sheet along a longitudinal direction of the chassis, and a plurality of first openings formed in the support sheet, wherein the support sheet is disposed perpendicular to a coolant air flow direction and coupled to the pair of walls; and
a first acoustic absorber comprising an acoustic material and a plurality of second openings formed in the acoustic material, wherein the first acoustic absorber is non-removably attached to the frame such that the acoustic material extends along a lateral direction of the chassis and covers an upstream surface of the support sheet, and each second opening is concentrically aligned with a respective first opening; and a plurality of fans disposed downstream relative to the acoustic absorber frame, wherein the pair of support walls is coupled to a fan cage of the plurality of fans via a pair of fasteners such that the acoustic absorber frame supports and holds the plurality of fans, wherein each fan is aligned with respective first and second openings, to draw the coolant air via a panel of the chassis to cool the plurality of rotational drives, and wherein the acoustic material absorbs a portion of reflected airborne noise from the plurality of rotational drives.

2. The computing system of claim 1,
wherein the acoustic material of the first acoustic absorber and the support sheet of the frame are merged with one another to form a unitary acoustic absorber frame;
wherein the frame comprises a polymer; and
wherein the first acoustic absorber comprises a polymer having a polyurethane material.

3. The computing system of claim 1,
wherein the acoustic material of the first acoustic absorber is coupled to the support sheet of the frame using an adhesive to form the acoustic absorber frame;
wherein the frame comprises a metal; and
wherein the first acoustic absorber comprises a polymer having a polyurethane material.

4. The computing system of claim 1, comprising a pair of second acoustic absorbers, each comprising a second acoustic material coupled to a portion of the pair of walls extending between the plurality of rotational drives and the acoustic absorber frame, wherein each second acoustic material of the pair of second acoustic absorbers absorbs another portion of reflected airborne noise from the plurality of rotational drives.

5. The computing system of claim 4, wherein each second acoustic material of the pair of second acoustic absorbers is coupled to the portion of a respective wall of the pair of walls using an adhesive, wherein the pair of walls comprises a metal, wherein the pair of second acoustic absorbers comprises a polymer having a polyurethane material.

6. The computing system of claim 1, wherein the chassis comprises a plurality of support structures spaced apart from each other and coupled to at least one of the base and one wall of the pair of walls, wherein the plurality of support structures extends along the longitudinal direction to define a plurality of partitions between a pair of mutually adjacent support structures of the plurality of support structures, and wherein the plurality of rotational drives is disposed in a stacked configuration within each partition and coupled to the pair of mutually adjacent support structures.

7. The computing system of claim 6, comprising a circuit card coupled to the plurality of support structures and communicatively coupled to the plurality of rotational drives, wherein the circuit card is disposed upstream relative to the acoustic absorber frame and extends along the lateral direction, wherein the circuit card comprises a plurality of third openings, each third opening is aligned to the respective second opening, and wherein the coolant air further cools the respective circuit card and flows through the respective third, second, and first openings.

8. The computing system of claim 1, wherein each of the plurality of rotational drives is a hard disk storage drive comprising at least one read write head arm.

9. The computing system of claim 1, wherein the acoustic material is an acoustic foam.

10. The computing system of claim 1, wherein each of the second openings is commensurate in size and shape to the one of the first openings with which the respective second opening is aligned.

11. The computing system of claim 1, wherein the plurality of first openings is not covered by the acoustic material.

12. A method comprising:
drawing coolant air by a plurality of fans of a computing system, through a panel of a chassis, in order to cool a plurality of rotational drives of a computing system;
generating airborne noise from the plurality of fans, while drawing the coolant air;
directing the airborne noise towards the plurality of rotational drives;
reflecting a portion of directed airborne noise from the plurality of rotational drives and transmitting another portion of the directed airborne noise into the plurality of rotational drives; and
absorbing a portion of reflected airborne noise using an acoustic absorber frame of the computing system, to decrease performance degradation of the plurality of rotational drives,
wherein the acoustic absorber frame comprises:
a frame comprising a support sheet, a pair of support walls spaced apart from each other and extending from the support sheet along a longitudinal direction of the chassis, and a plurality of first openings formed on the support sheet, wherein the support sheet is disposed perpendicular to a coolant air flow direction and coupled to a pair of walls of the chassis; and
a first acoustic absorber comprising an acoustic material and a plurality of second openings formed in the acoustic material, wherein the first acoustic absorber is non-removably attached to the frame such that the acoustic material extends along a lateral direction of the chassis and covers an upstream surface of the support sheet, and each second opening is concentrically aligned with a respective first opening to allow each fan to draw the coolant air through the panel, wherein the plurality of fans is disposed downstream relative to the acoustic absorber frame, and wherein the pair of support walls is coupled to a fan cage of the plurality of fans via a pair of fasteners such that the acoustic absorber frame supports and holds the plurality of fans.

13. The method of claim 12, wherein reflecting a portion of directed airborne noise further comprises reflecting the portion of directed airborne noise from a circuit card communicatively coupled to the plurality of rotational drives and transmitting other portion of the directed airborne noise into the circuit card.

14. The method of claim 12, comprising absorbing another portion of the reflected airborne noise using a second acoustic material of each second acoustic absorber of a pair of second acoustic absorbers, wherein each second acoustic material of the pair of second acoustic absorbers is coupled to a portion of a respective wall of the pair of walls extending between the plurality of rotational drives and the acoustic absorber frame.

15. The method of claim 14, wherein each of the first acoustic absorber and the pair of second acoustic absorbers comprises a polymer having a polyurethane material.

16. The method of claim 12, wherein the acoustic material is an acoustic foam.

17. A computing system comprising:
a chassis;
a plurality of electronic devices disposed in the chassis;
an acoustic absorber frame comprising:
- a frame disposed in and coupled to the chassis, the frame comprising a support sheet, a pair of support walls spaced apart from each other and extending from the support sheet along a longitudinal direction of the chassis, and a plurality of first openings formed in the support sheet, wherein the support sheet is disposed perpendicular to a coolant air flow direction;
- a first acoustic absorber comprising an acoustic material and a plurality of second openings formed in the acoustic material, wherein the first acoustic absorber is non-removably attached to a first surface of the support sheet between the plurality of electronic devices and the frame such that the plurality of first openings is concentrically aligned with the plurality of second openings, respectively, and the plurality of first openings is not covered by the acoustic material;
- a plurality of fans coupled to the frame, positioned adjacent to a second surface of the support sheet in alignment with the first and second openings, respectively, and configured to flow coolant air through the chassis to cool the plurality of electronic devices,
- wherein the pair of support walls is coupled to a fan cage of the plurality of fans via a pair of fasteners such that the acoustic absorber frame supports and holds the plurality of fans, and
- wherein the first acoustic absorber is configured to absorb a portion of reflected airborne noise from the plurality of electronic devices.

18. The computing system of claim 17,
wherein the chassis comprises a base and a pair of walls coupled to opposite sides of the base,
wherein the frame is coupled to, and extends between, the pair of walls;
wherein the computing system comprises a pair of second acoustic absorbers, each comprising a second acoustic material coupled to a portion of the pair of walls extending between the plurality of electronic devices and the frame,
wherein each second acoustic material of the pair of second acoustic absorbers is configured to absorb another portion of reflected airborne noise from the plurality of electronic devices.

19. The computing system of claim 17, wherein the acoustic material comprises an acoustic foam.

20. The computing system of claim 17, wherein each of the second openings is commensurate in size and shape to the one of the first openings with which the respective second opening is aligned.

* * * * *